(12) United States Patent
Tripathi et al.

(10) Patent No.: US 10,614,083 B2
(45) Date of Patent: Apr. 7, 2020

(54) METHOD AND SYSTEM FOR IDENTIFYING INCIPIENT FIELD-SPECIFIC ENTITY RECORDS

(71) Applicant: Innoplexus AG, Eschborn (DE)

(72) Inventors: Gaurav Tripathi, Pune (IN); Vatsal Agarwal, Rampur (IN); Gunjan Bhardwaj, Taunus (DE); Amol Suki, Pune (IN); Sidhanta Nayak, Baragam (IN); Akshesh Doshi, Udaipur (IN)

(73) Assignee: Innoplexus AG, Eschborn (DE)

( * ) Notice: Subject to any disclaimer, the term of this patent is extended or adjusted under 35 U.S.C. 154(b) by 280 days.

(21) Appl. No.: 15/855,835

(22) Filed: Dec. 27, 2017

(65) Prior Publication Data

US 2018/0246893 A1    Aug. 30, 2018

Related U.S. Application Data

(60) Provisional application No. 62/465,128, filed on Feb. 28, 2017.

(51) Int. Cl.
*G06F 16/00* (2019.01)
*G06F 16/2457* (2019.01)
*G06F 16/248* (2019.01)
*G06F 16/35* (2019.01)

(52) U.S. Cl.
CPC ...... *G06F 16/24578* (2019.01); *G06F 16/248* (2019.01); *G06F 16/35* (2019.01)

(58) Field of Classification Search
CPC .. G06F 16/35; G06F 16/248; G06F 16/24578; G06F 16/288; G06F 17/278; G06F 16/285; G06F 16/3332; G06F 16/13
See application file for complete search history.

(56) References Cited

U.S. PATENT DOCUMENTS

| 8,266,168 | B2 * | 9/2012 | Bayliss | G06F 16/285 707/758 |
| 8,484,211 | B2 * | 7/2013 | Bayliss | G06F 16/24578 707/736 |

(Continued)

FOREIGN PATENT DOCUMENTS

EP    3370193 A1 *  9/2018    ......... G06F 7/026

*Primary Examiner* — Cheryl Lewis
(74) *Attorney, Agent, or Firm* — Ziegler IP Law Group, LLC

(57) ABSTRACT

A method of identifying incipient field-specific entity records required by a user. The method includes receiving user-input of a specific field, wherein the specific field corresponds to a specific field segment, obtaining field-specific entity records associated with the specific field segment, analyzing each of the field-specific entity records to determine an importance score, identifying at least one pair of field-specific entity records having at least one similar entity attribute and designating relations between them, determining weightage score of each relation between the at least one pair of field-specific entity records, determining change in the importance score and change in weightage scores of each relation associated with each field-specific entity record over a predefined duration of time, determining net score of each of the field-specific entity records and identifying incipient field-specific entity records based on the net score of each of the field-specific entity records.

19 Claims, 2 Drawing Sheets

(56) References Cited

U.S. PATENT DOCUMENTS

| | | | | |
|---|---|---|---|---|
| 8,495,077 B2* | 7/2013 | Bayliss | ............... | G06F 16/285 |
| | | | | 707/758 |
| 8,510,323 B2* | 8/2013 | Eshwar | ............... | G06F 16/2465 |
| | | | | 707/765 |
| 8,965,914 B2* | 2/2015 | Eshwar | ............... | G06F 16/2465 |
| | | | | 707/765 |
| 9,058,380 B2* | 6/2015 | Lesiecki | ............. | G06F 16/2468 |
| 2019/0205318 A1* | 7/2019 | Tripathi | ............... | G06F 16/288 |

* cited by examiner

METHOD AND SYSTEM FOR IDENTIFYING INCIPIENT FIELD-SPECIFIC ENTITY RECORDS

CROSS REFERENCE TO RELATED APPLICATIONS

This application claims priority to U.S. Provisional Patent Application No. 62/465,128, filed Feb. 28, 2017, which is hereby incorporated by reference in its entirety.

TECHNICAL FIELD

The present disclosure relates generally to identification of entities; and more specifically to methods and systems for identification of incipient field-specific entity records. Moreover, the present disclosure also relates to computer readable medium containing program instructions for execution on a computer system, which when executed by a computer, cause the computer to perform method steps for identifying incipient field-specific entity records.

BACKGROUND

In recent times, there has been a significant increase in attention given to research work and corresponding development activities in various industries. Typically, growth of the industry is determined by periodic launches of products and services associated with the industry. Conventionally, successful development of such products and services is initiated by influential leaders in the industry (such as researchers with well-established track records, leaders of successful companies within the industry and suchlike), who are accompanied by other emerging influential entities within the industry (such as researchers studying emerging concepts, leaders associated with emerging startups within the industry and so forth). Specifically, nurturing the emerging influential entities is crucial in deciding a progress of the industry in a subsequent time. Consequently, their presence is invaluable for the industry and identifying such emerging influential entities at a nascent stage is extremely important.

Generally, various techniques are practiced to identify the emerging influential entities. Traditionally, recommendations from well-established sources (such as successful influential leaders within the industry), surveying various entities associated with the industry (such as people working in the industry) and collecting data for the industry are some of the techniques that are used to identify the emerging influential entities within the industry. However, the aforesaid techniques are prone to being influenced by human judgment, thereby, yielding a skewed result. In addition, the techniques are laborious and time consuming. Moreover, such techniques are reliant on analysis within constant time duration, overlooking a change achieved by emerging influential entities in a time period outside the time duration of consideration. Additionally, the traditional techniques are not dynamic, such that they cannot be adapted to different user requirements, thus, generating limited results.

Moreover, a deciding factor of potential of the emerging influential entities may be associated with how they are associated to multiple other influential entities. However, manually tracking such associations between various emerging influential entities may not be feasible. For example, the associations may change with time and it may not be possible to regularly update such information for a large number of the emerging influential entities. Therefore, maintaining records of influential entities within different industries by using conventional techniques is generally inefficient, cumbersome, unreliable, and does not allow identification of the emerging influential entities.

Therefore, in light of the foregoing discussion, there exists a need to overcome the aforementioned drawbacks associated with the conventional techniques of identifying emerging influential entities within various industries.

SUMMARY

The present disclosure seeks to provide a method of identifying incipient field-specific entity records required by a user. The present disclosure also seeks to provide a system for identifying incipient field-specific entity records required by a user. Furthermore, the present disclosure seeks to provide a software product recorded on machine-readable non-transient data storage media, wherein the software product is executable upon computing hardware to implement the aforementioned method. The present disclosure seeks to provide a solution to the existing problems associated with identification of emerging influential entities within industries by using conventional techniques. An aim of the present disclosure is to provide a solution that overcomes at least partially the problems encountered in prior art, and provides effective and accurate method and system for identifying incipient field-specific entity records.

In one aspect, an embodiment of the present disclosure provides a method of identifying incipient field-specific entity records required by a user, the method comprising:
  receiving a user-input of a specific field from the user, wherein the specific field corresponds to a specific field segment of at least one field segment;
  obtaining field-specific entity records comprising an entity name and a plurality of entity attributes, wherein each of the field-specific entity records is associated with the specific field segment;
  analyzing the field-specific entity records in the specific field segment, to determine an importance score of each of the field-specific entity records;
  identifying at least one pair of field-specific entity records having at least one similar entity attribute in the specific field segment;
  designating relations between each field-specific entity record of the identified at least one pair of field-specific entity records;
  determining a weightage score of each of the relations between the at least one pair of field-specific entity records;
  determining:
    a change in the importance score of each of the field-specific entity records over a predefined duration of time, in the specific field segment;
    a change in weightage scores of each of the relations associated with each field-specific entity record of the at least one pair of field-specific entity records over the predefined duration of time, in the specific field segment; and
    a net score of each of the field-specific entity records based on the change in the importance score and the weightage scores;
  and
  identifying the incipient field-specific entity records based on the net score of each of the field-specific entity records in the specific field segment.

In another aspect, an embodiment of the present disclosure provides a system for identifying incipient field-specific entity records required by a user, the system comprising:

a database arrangement operable to store the field-specific entity records; and a processing module communicably coupled to the database arrangement, wherein the processing module is operable to:

receive a user-input of a specific field from the user, wherein the specific field corresponds to a specific field segment of at least one field segment;

obtain field-specific entity records comprising an entity name and a plurality of entity attributes, wherein each of the field-specific entity records is associated with the specific field segment;

analyze the field-specific entity records in the specific field segment, to determine an importance score of each of the field-specific entity records;

identify at least one pair of field-specific entity records having at least one similar entity attribute in the specific field segment;

designate relations between each field-specific entity record of the identified at least one pair of field-specific entity records;

determine a weightage score of each of the relations between the at least one pair of field-specific entity records;

determine:

a change in the importance score of each of the field-specific entity records over a predefined duration of time, in the specific field segment;

a change in the weightage scores of each of the relations associated with each field-specific entity record of the at least one pair of field-specific entity records over the predefined duration of time, in the specific field segment; and a net score of each of the field-specific entity records based on the change in the importance score and the weightage scores;

and identify the incipient field-specific entity records based on the net score of each of the field-specific entity records in the specific field segment.

In yet another aspect, an embodiment of the present disclosure provides a computer readable medium containing program instructions for execution on a computer system, which when executed by a computer, cause the computer to perform method steps for identifying incipient field-specific entity records required by a user, the method comprising the steps of:

receiving a user-input of a specific field from the user, wherein the specific field corresponds to a specific field segment of at least one field segment;

obtaining field-specific entity records comprising an entity name and a plurality of entity attributes, wherein each of the field-specific entity records is associated with the specific field segment;

analyzing the field-specific entity records in the specific field segment, to determine an importance score of each of the field-specific entity records;

identifying at least one pair of field-specific entity records having at least one similar entity attribute in the specific field segment;

designating relations between each field-specific entity record of the identified at least one pair of field-specific entity records;

determining a weightage score of each of the relations between the at least one pair of field-specific entity records;

determining:

a change in the importance score of each of the field-specific entity records over a predefined duration of time, in the specific field segment;

a change in weightage scores of each of the relations associated with each field-specific entity record of the at least one pair of field-specific entity records over the predefined duration of time, in the specific field segment; and a net score of each of the field-specific entity records based on the change in the importance score and the weightage scores;

and identifying the incipient field-specific entity records based on the net score of each of the field-specific entity records in the specific field segment.

Embodiments of the present disclosure substantially eliminate or at least partially address the aforementioned problems in the prior art, and provides an effective and accurate method for identifying incipient field-specific entity records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
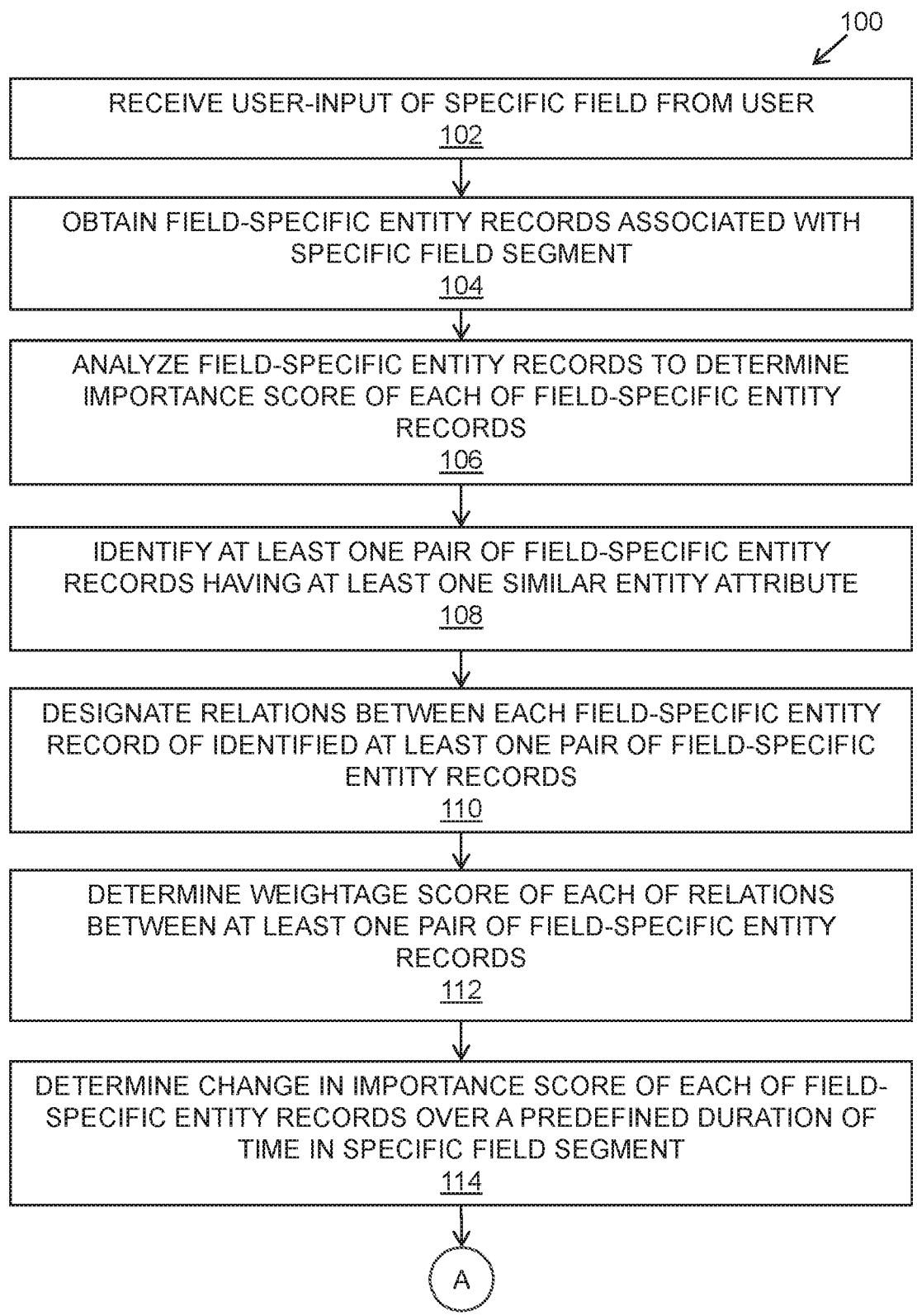
FIGS. 1A-B are illustrations of steps of a method of identifying incipient field-specific entity records required by a user, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of identifying incipient field-specific entity records required by a user, the method comprising:

receiving a user-input of a specific field from the user, wherein the specific field corresponds to a specific field segment of at least one field segment;

obtaining field-specific entity records comprising an entity name and a plurality of entity attributes, wherein each of the field-specific entity records is associated with the specific field segment;

analyzing the field-specific entity records in the specific field segment, to determine an importance score of each of the field-specific entity records;

identifying at least one pair of field-specific entity records having at least one similar entity attribute in the specific field segment;

designating relations between each field-specific entity record of the identified at least one pair of field-specific entity records;

determining a weightage score of each of the relations between the at least one pair of field-specific entity records;

determining:
a change in the importance score of each of the field-specific entity records over a predefined duration of time, in the specific field segment;
a change in weightage scores of each of the relations associated with each field-specific entity record of the at least one pair of field-specific entity records over the predefined duration of time, in the specific field segment; and
a net score of each of the field-specific entity records based on the change in the importance score and the weightage scores;

and identifying the incipient field-specific entity records based on the net score of each of the field-specific entity records in the specific field segment.

In another aspect, an embodiment of the present disclosure provides a system for identifying incipient field-specific entity records required by a user, the system comprising:

a database arrangement operable to store the field-specific entity records; and a processing module communicably coupled to the database arrangement, wherein the processing module is operable to:

receive a user-input of a specific field from the user, wherein the specific field corresponds to a specific field segment of at least one field segment;

obtain field-specific entity records comprising an entity name and a plurality of entity attributes, wherein each of the field-specific entity records is associated with the specific field segment;

analyze the field-specific entity records in the specific field segment, to determine an importance score of each of the field-specific entity records;

identify at least one pair of field-specific entity records having at least one similar entity attribute in the specific field segment;

designate relations between each field-specific entity record of the identified at least one pair of field-specific entity records;

determine a weightage score of each of the relations between the at least one pair of field-specific entity records;

determine:
a change in the importance score of each of the field-specific entity records over a predefined duration of time, in the specific field segment;
a change in the weightage scores of each of the relations associated with each field-specific entity record of the at least one pair of field-specific entity records over the predefined duration of time, in the specific field segment; and
a net score of each of the field-specific entity records based on the change in the importance score and the weightage scores;

and identify the incipient field-specific entity records based on the net score of each of the field-specific entity records in the specific field segment.

The method and the system enable identification of incipient field-specific entity records. Beneficially, the method enables to segment a large number of entity records from the existing data sources, to an easily manageable set of entity records in specific field segments. For example, data related to incipient field-specific entity records can be extracted from various sources, including publically available sources of research publications, social networking websites, blogs, news websites, company websites, government websites, online surveys and so forth. Subsequently, such data can be used for identifying the incipient field-specific entity records within one or more fields. Thus, the method provides a dynamic way of identifying incipient field-specific entity records. Additionally, the method enables identification of relations between pairs of incipient field-specific entity records in a specific field segment. Furthermore, analysing the relations helps in determining growth of the incipient field-specific entity record over a period of time. Beneficially, emerging fields can also be identified to determine entity records associated therewith. Moreover, the method can be implemented with minimal human intervention, thereby ensuring reduced chances of obtaining misleading results due to error of judgement and/or personal bias. Specifically, the method and the system enable accurate and efficient identification of incipient field-specific entity records.

Throughout the present disclosure, the term "entity" as used herein, relates to one or more persons, organizations, and so forth. For example, the entity may be a researcher, a market influencer, a company, a physician and suchlike. Furthermore, an expertise of the entity may be required to be ascertained in an industry for various purposes. For example, the expertise of the entity may be required for development, launch and/or promotion of a new service or product. Such an entity may play a key role in developing, launching and/or promoting the new service or product by providing their expertise. Furthermore, it may be beneficial to acquire such expertise from a primary field-specific entity, such as from an entity who is an expert in a specific field of the industry. However, it may be equally beneficial to identify entities in a nascent stage that have a potential to become a primary field-specific entity within the specific field in a subsequent time. Specifically, such entities have been referred to as "incipient field-specific entities" hereinafter. For example, such incipient field-specific entities may be easily accessible for providing their expertise (such as, for developing, launching and/or promoting a new service or product) to a user (such as a company looking to develop, launch and/or promote the new service or product) as compared to the primary field-specific entities. The method enables identification of such incipient field-specific entity records required by the user. Furthermore, there may be multiple incipient field-specific entities within the field that are capable of providing their expertise to the user.

The method comprises receiving a user-input of specific field from the user, wherein the specific field corresponds to specific field segment of at least one field segment. Specifically, the term "field" as used herein, refers to a domain or an area of expertise of each of the entity records. In an example, the field may include medicine, pediatrics and so forth. Furthermore, the field of medicine may be associated with at least one field segment, such as, oncology, dermatology, orthopedics, and suchlike. In such an instance, the user-input may correspond to a specific field segment of the at least one field segment, such as, to "oncology". The user-input may be obtained from the user in a form of a text input corresponding to the name of the specific field segment. In an example, the user-input may be "oncology". In another example, the user-input may be "paediatrics". Furthermore, the name of various field segments may be compiled in a form of a list. Consequently, such list of field segments may be presented to the user and the user may provide the user-input as a selection of the specific field segment from the displayed list.

The method comprises obtaining field-specific entity records comprising an entity name and a plurality of entity attributes, wherein each of the field-specific entity records is associated with the specific field segment. Throughout the present disclosure, the term "entity records" as used herein, relates to information associated with the entities. Specifically, the entity records are obtained by processing (namely, refining) such retrieved information. The entity records comprise entity names and plurality of entity attributes associated with the entity names. Specifically, the term "entity name" relates to a subject of information included in the entity records. For example, the entity name may belong to one or more persons, organizations and so forth. The term "entity attributes" as used throughout the present disclosure, relates to information related to the entity name. The entity records include multiple fields of information about the entity name that comprise the plurality of entity attributes. In an example, the entity attribute includes data related to achievements of the entity in their field. In another example, the plurality of entity attributes may include information regarding correspondence address, academic background, birthdate, research work, publication works and so forth of the entity.

For example, entity records associated with entities "Jonas", "Julia", "Mia", "Jessica" and "John" may be related to the fields "Oncology", "Pediatrics", "Oncology", "Dermatology" and "Pediatrics" respectively. Consequently, the entity records "Jonas" and "Mia" correspond to a common field segment "Oncology" and the entity records are field-specific entity records for "Oncology". Similarly, the entity records "Julia" and "Jessica" correspond to the field segment "Pediatrics" and the entity records are field-specific entity records for "Pediatrics". Moreover example, a user-input received from a user corresponds to the specific field segment of "oncology". Furthermore, an entity record associated with an entity name "John" may comprise entity attributes comprising information about academic background (such as a university that the entity may have graduated from) and a current organization of work of the entity. In such an example, the entity attribute comprising information about academic background of the entity may be "Stanford University, Department of Oncology", and the entity attribute comprising information about current organization of work of the entity may be "Centre for Cancer Research, National Cancer Institute". In such an instance, the field segment of the entity record may be identified based on at least one of the plurality of entity attributes of the entity record. In the aforementioned example, the field segment of the entity record "John" may be identified as the specific field segment "oncology" from the aforementioned entity attributes of the entity record.

The field-specific entity records may be stored in a database arrangement. Furthermore, the database arrangement is operable to store the existing data sources, the structured database, the open source database and so forth. Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The database arrangement includes any data storage software and system, such as, for example, a relational database like IBM DB2 and Oracle 9. Furthermore, the data storage software and system may include MongoDB, HBase, ElasticSearch, Neo4J, ArangoDB and so forth. Additionally, the database arrangement refers to a software program for creating and managing one or more databases. Optionally, the database arrangement may be operable to support relational operations, regardless of whether it enforces strict adherence to the relational model, as understood by those of ordinary skill in the art.

Optionally, a processing module is communicably coupled to the database arrangement, wherein the processing module is operable to obtain field-specific entity records comprising an entity name and a plurality of entity attributes, wherein each of the field-specific entity records is associated with at least one field segment. Throughout the present disclosure, the term "processing module" as used herein, relates to a computational element that is operable to respond to and process instructions. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term processing module may refer to one or more individual processors, processing devices and various elements associated with a processing device that may be shared by other processing devices. Additionally, the one or more individual processors, processing devices and elements are arranged in various architectures for responding to and processing the instructions.

Beneficially, the processing module is operatively coupled to a communication module. Throughout the present disclosure, the term "communication module" as used herein, relates to an arrangement of interconnected programmable and/or non-programmable components that are configured to facilitate data communication between one or more electronic devices, software modules and/or databases, whether available or known at the time of filing or as later developed. Additionally, the communication module employs wired or wireless communication that can be carried out via any number of known protocols. Moreover, the communication module is operable to access the database arrangement and communicate the accessed data to the processing module. Consequently, the coupling of processing module and communication module enables exchange of data between the database arrangement and the processing module. For example, the field-specific entity records stored in the database arrangement are accessible to the processing module via the communication module.

Optionally, the field-specific entity records may be obtained from a structured database, an open source database, a proprietary database with licensed access and the like.

Optionally, the method comprises developing a structured database by extracting entity records from existing data sources, wherein each of the entity records comprises an entity name and a plurality of entity attributes. Throughout the present disclosure, the term "existing data sources" as used herein, relates to organized or unorganized sources of digital information regardless of the manner in which the information is represented therein. Specifically, when such digital information is related to entities, the digital information is referred to as data records. Furthermore, the existing data sources may be publically available internet sources. For example, the existing data sources may include research publications, social networking websites, blogs, news websites, company institutes, government websites, online surveys and so forth. Specifically, the structured database includes multiple entity records and each entity record would comprise the entity name denoting name of the entity and the plurality of entity attributes, including but not limited to, education qualifications, address, organization of work and the like. In an embodiment, structured database is developed by identifying at least one field of each of the entity records based on at least one of the plurality of entity attributes. Specifically, the field of expertise of the entity records is identified with the help of the plurality of entity attributes. Thereby, a structured database is generated containing entity records in their identified specific fields. Furthermore, the method comprises developing the structured database by segmenting the entity records into at least one field segment based on the identified at least one field of each of the entity records, to obtain field-specific entity records. Moreover, optionally, the structured database may be developed to store the data records related to various field-specific entities in an organized manner. Specifically, the structured database comprises field-specific entity records stored under respective field segments.

In one embodiment, developing the structured database further comprises classifying each of the plurality of entity attributes into at least one class. The term "class" as used herein, relates to a category into which the one or more entity attributes can be classified. Examples of the class may include, but are not limited to, birthdate, research papers, correspondence address, and academic background. For example, the entity attribute with data about date of birth of the entities may be tagged with the class "birthdate". Additionally, entity attribute with data about the University of Graduation of the entity may be tagged with the class "academic background". Typically, each of the plurality of entity attributes is classified into at least one class. Furthermore, the classified at least one class of the entity attribute provides information about the type of data record included in the entity attribute.

Optionally, the entity records are extracted by crawling the existing data sources. Specifically, the existing data sources are associated with multiple sources of digital information that the entity records are extracted from. Furthermore, such digital information is required to be aggregated within the existing data sources. In such an instance, the processing module is operable to crawl the existing data sources to extract the entity information therefrom. For example, the processing module comprises at least one crawler that is operable to extract the entity records by crawling the existing data sources. Optionally, the at least one crawler is implemented using a distributed architecture. Furthermore, when the crawling module is implemented in the distributed architecture, the programs (such as bots and/or web spiders) for browsing the existing data sources (such as World Wide Web, referred to hereinafter as "web") are configured to be hosted on one or more processing modules that are spatially separated from each other. Optionally, the entity records may be extracted in a tabular form subsequent to crawling the existing data sources. In such an instance, a first cell in a column of the table may include the entity name and remaining cells in the column may include the plurality of entity attributes associated with the entities. Furthermore, the crawling module assists the database arrangement to discard information pertaining to other similar entity names. In an example, there could be multiple entity records with an entity name "John" present in the existing data sources. Subsequently, assigning the relevant entity attribute to each of the entity name "John" will ensure that there are no multiple records for a same entity with the entity name "John".

Furthermore, the plurality of the entity attributes may be similar for different entity records. In an example, a first entity record with an entity name "Jonas" may comprise information such as name of a university from where the entity has acquired education, publication details, research work, and correspondence address. Additionally, a second entity record with an entity name "Julia" may comprise information such as name of a university from where the entity has acquired education, publication details, research work, and correspondence address. In the same example, a third entity record with entity name "Mia" may comprise information such as name of a university from where the entity has acquired education, publication details and correspondence address but no information on the research work of the entity. Therefore, the structured database would comprise entity records of the three entity names with information on the name of university from where the entity has acquired education, publication details, and correspondence address. Additionally, information on research work would be available for the entities with entity names "Jonas" and "Julia" but not for the entity with the entity name "Mia". Therefore, it may be beneficial to develop the database arrangement comprising the entity attributes for the entity records. Furthermore, the database arrangement may include all the data records crawled from the existing data sources and store the entity records in an organized and uniform format.

The method comprises analyzing the field-specific entity records in the specific field segment, to determine an importance score of each of the field-specific entity records. Specifically, the importance score relates to an individual score of the each of the field-specific entity records in the specific field received from the user. Furthermore, the importance score of the field-specific entity records may be determined based on the plurality of entity attributes of each of the field-specific entity records. In an embodiment, determining the importance score of each of the field-specific entity records comprises determining an attribute-specific importance score for each of the plurality of entity attributes associated with each of the field-specific entity records. Consequently, the plurality of entity attributes may be analysed to determine significance thereof and such a significance of the plurality of entity attributes may influence the importance score of each of the field-specific entity records. Specifically, the attribute-specific importance score of an entity attribute may be determined based on the significance of the entity attribute. For example, entity attributes such as birthdate, correspondence address, email address and so forth may have a significantly low attribute-specific importance score. Optionally, the attribute-specific importance score may not be determined for such entity attributes. However, entity attributes such as academic background, field of work, organization of work may have a high attribute-specific importance score. Optionally, the attribute-specific importance score may be determined solely for such entity attributes. Furthermore, the entity attribute with information for academic background being a top-tier college within the industry, may have a higher attribute-specific importance score in comparison to another entity attributes with information for academic background being a second-tier college.

The method comprises identifying at least one pair of field-specific entity records having at least one similar entity attribute in the specific field segment. Specifically, a pair of field-specific entity records may be identified based on at least one similar entity attribute shared therebetween. Moreover, the at least one pair of field-specific entity records may be associated with a same field segment, such as, the specific field segment received from the user. For example, a pair of entities having common organization of work may reflect similar entity attribute in the pair of entity records thereof within the specific field segment. Therefore, such at least one pair of entity records may be identified based on the at least one similar attribute. In an example, the structured database may comprise entity records with entity names "Jonas", "Julia", "Mia", "John" and "Jessica". In such an example, entities "Jonas" and "Mia" may have co-authored a research publication related to a specific field segment of "Oncology". Therefore, the entity records for "Jonas" and "Mia" may comprise data associated with the research publication as entity attributes therein. Subsequently, in such an example, the entity records "Jonas" and "Mia" may be identified as a pair of entity records based on the shared similar entity attribute of the research publication within the specific field segment. In the same example, the entity records "Julia" and "Jessica" may be in the same organization of work in the specific field segment "Paediatrics". Thus, the entity records "Julia" and "Jessica" may be identified as a pair based on the shared similar entity attribute of the organization of work within the specific field segment.

The method comprises designating relations between each field-specific entity record of the identified at least one pair of field-specific entity records. Throughout the present disclosure, the term "relation" as used herein, refers to association between each of the at least one pair of field-specific entity records. For example, the relation between the identified at least one pair of field-specific entity records may include number of publications co-authored, being co-inventors of one or more inventions, colleagues, classmates and so forth. In the aforementioned example, a co-author relation may be designated between the identified pair of first entity record "Jonas" and third entity record "Mia". Optionally, determining the importance score of each of the field-specific entity records comprises determining a number of relations designated between the field-specific entity records between each of the field-specific entity records and at least one of the other field-specific entity records. Specifically, the number of relations of a particular field-specific entity record with one or more other field-specific entity records is determined. In an example, in addition to the co-author relation already existing between "Jonas" and "Mia" in the specific field segment "Oncology"; they may establish a relation of same organization of work therebetween. In another example, "Mia" of field segment "Oncology" may establish a acquaintance relation with "Jessica" of field segment "Paediatrics". It will be appreciated that a field-specific entity record with a higher number of relations with the other field-specific entity records may have a higher importance in comparison with a field-specific entity record with a lower number of relations with the other field-specific entity records. Thus, the numbers of relations of the field-specific entity records impact the importance score of the entity records.

The method comprises determining a weightage score of each of the relations between the at least one pair of field-specific entity records. Specifically, the weightage score relates to strength of each of the relations between the at least one pair of field-specific entity records. Furthermore, the weightage score of each of the relations between the at least one pair of field-specific entity records is determined, based on the nature of relation between the pair, the similar attributes shared between the pair and the like. For example, the weightage score of the relation between the field-specific entity records of the at least one pair of field-specific entity records may be determined by the number of publications co-authored, amount of research work done together (such as time spent together researching a particular topic), inventions co-invented and so forth. Furthermore, a higher number of publications co-authored, higher amount of research work and/or a higher number of mutual inventions co-invented together between the pair of entity records, may provide a higher weightage score to the relation therebetween. Moreover, a higher number of similar entity attributes between the pair of field-specific entity records may further increase the weightage score of the relation therebetween. In an example, the weightage score is determined for the relation between the first entity record with the entity name "Jonas" and the third entity record with the entity name "Mia" based on the number of publications co-authored. In such an example, if the number of publications co-authored therebetween is four, the relation is assigned a higher weightage score as compared to if the number of publications co-authored is one.

According to an embodiment, determining the importance score of each of the field-specific entity records comprises aggregating the determined attribute-specific importance scores, the number of designated relations and the weightage scores of the designated relations. In an example, determining the importance score of "Jonas" would comprise aggregating the attribute-specific score of "Jonas", the number of relations "Jonas" shares with the at least one of the other field-specific entity records and the weightage score of each of those relations. Specifically, the importance score determined by such aggregation may provide an accurate estimation to understand the importance of the field-specific entity record.

The method comprises determining a change in the importance score of each of the field-specific entity records over a predefined duration of time, in the specific field segment. Specifically, the change in importance score of the field-specific entity record depends on the change in the attributes of the entity record, the number of relations added by the entity record and the weightage score of the each of the relations established therein. In an example, "Julia" may acquire an additional educational qualification from a top-tier college in a further specialization of the field "Pediatrics" within a period of two years. Therefore, such an additional educational qualification changes the importance score of "Julia" within the predefined duration of time comprising the period of two years.

Moreover, the change in importance score is determined between field-specific entity records of the specific field segment. In an example, the change in the importance score of "Jonas" and "Mia" within the field segment "Oncology" is determined. In another example, change in importance score of "Julia" and "Jessica" within the field segment "Pediatrics" is determined. In the same example, a change will be reflected in the importance score of "Julia" on establishing an association with a primary field-specific entity record "Bob" having a higher importance score within the field segment "Pediatrics".

Additionally, the change will be reflected in the importance score when there is a significant rise in the number of relations established by the field-specific entity records with other field-specific entity records in the same field segment. In one embodiment, the method further comprises receiving a user-input of a time period from the user, wherein the time period is associated with the predefined duration of time. Specifically, the user-input provided herein signifies the specific time period of analysis required by the user. For example, the processing arrangement is operable to use the time period received from the user as the predefined duration of time to extract incipient field-specific entity records from that specific time period.

The method comprises determining a change in weightage scores of each of the relations associated with each field-specific entity record of the at least one pair of field-specific entity records over the predefined duration of time, in the specific field segment. Specifically, the weightage score of the at least one pair is evaluated on the basis of the relations designated therebetween. In an example, the relation between a pair of field-specific entity records may be enhanced owing to increased number of publications co-authored by the pair of field-specific entity records in the predefined duration of time. In another example, the relation between a pair of field-specific entity records may be dormant due to no additional work done by the pair of field-specific entity records in the predefined duration of time. It will be appreciated that the change in relations between each of the pair of field-specific entity records is reflected as a change in the weightage score therebetween. For example, when the relation between the pair of field-specific entity records is dormant, the weightage score of the relation remains the same. Optionally, the weightage score of the relation decreases if the relation between the pair of field-specific entity records is dormant in the predefined duration of time. The method comprises determining a net score of each of the field-specific entity records based on the change in the importance score and the weightage scores. The net score is obtained by analyzing the change in importance score and weightage score of the field-specific entity record over the predefined duration of time. For example, "Julia" may acquire additional educational qualifications; establish relations with primary entity records such as "Bob" and co-author ten publications with "Jessica" and fifteen publications with "Bob" in the field segment "Pediatrics" in the predefined duration of time. Thus, the importance score and weightage score reflect a considerable increase in the net score for "Julia" within the predefined duration of time. In another example, "Jessica" may have only co-authored ten publications with "Julia" in the field segment "Pediatrics" in the predefined duration of time period. Thus, the importance score and weightage score for "Jessica" reflect negligible change in the net score thereof.

Optionally, the determined net score is used to identify at least one of a positive growth and/or a negative growth of each of the field-specific entity records. Specifically, an increase in the net score reflects a positive growth of the field-specific entity record over the predefined duration of time. Alternatively, a decrease in the net score reflects a negative growth of the field-specific entity record over the predefined duration of time. The method comprises identifying the incipient field-specific entity records based on the net score of each of the field-specific entity records in the specific field segment. Specifically, such incipient field-specific entity records are associated with the positive growth (or increase in the net score) over the predefined duration of time. In the above example, "Julia" reflects a positive growth whereas "Jessica" reflects a negative growth. Thereby, "Julia" is identified as the incipient field-specific entity record in the specific field segment "Pediatrics". Moreover, based on a user requirement, the number of identified incipient field-specific entity records can be varied. In an example, the user may need to identify only two incipient field-specific entity records within the specific field segment and in the predefined duration of time (such as, based on the user-input received from the user). In another example, the user may need to identify ten incipient field-specific entity records.

In an embodiment, the method further comprises developing an ontology for each of the at least one field. Throughout the present disclosure, the term "ontology" as used herein, relates to a set of concepts (namely, information, ideas, data, semantic associations and so forth) in the field (namely, domain and so forth) that elaborates types and properties of the set of concepts and semantic associations established thereof. Specifically, the ontology provides information on how certain concepts in the specific field may be related to one or more concepts in other fields. Furthermore, the ontology provides a base for extracting contextually (namely, conceptually) relevant information pertaining to the specific field required by the user. Additionally, the ontology provides a structured, optimal and relevant set of concepts pertaining to the specific field required by the user. Optionally, the method further comprises determining at least one similar field to the specific field based on the ontology of the specific field. In an example, "Lymphoma Cancer" may be the specific field received from the user. In such an example, "Non-Hodgkin" and "Thyroid" may be similar fields determined on the basis of the developed ontology. Moreover, developing the ontology provides significant outcome for conducting scientific research, academic studies, market analysis and so forth. Optionally, the ontology may include concepts in form of text, image, audio, video, or any combination thereof. In an embodiment, the method further comprises identifying at least one incipient field-specific entity record from the at least one similar field. In the aforementioned example, when the incipient field-specific entity record is identified from the specific field of "Lymphoma Cancer", at least one incipient field-specific entity record may be identified from the fields of "Non-Hodgkin" and/or "Thyroid". Such incipient field-specific entity records may also be capable of providing their expertise, for example, when incipient field-specific entity records cannot be identified in the specific field. Specifically, the identified similar field expands the field of reference for identifying incipient field-specific entity records. Thus, it leads to identifying incipient field-specific entities from such similar fields.

Disclosed is a system for identifying incipient field-specific entity records required by a user, wherein the system comprises a database arrangement operable to store the field-specific entity records. Furthermore, the system comprises a processing module communicably coupled to the database arrangement, wherein the processing module is operable to receive a user-input of a specific field from the user, wherein the specific field corresponds to a specific field segment of at least one field segment; obtain field-specific entity records comprising an entity name and a plurality of entity attributes, wherein each of the field-specific entity records is associated with the specific field segment; analyze the field-specific entity records, in the specific field segment, to determine an importance score of each of the field-specific entity records; identify at least one pair of field-specific entity records having at least one similar entity attribute in the specific field segment; designate relations between each field-specific entity record of the identified at least one pair of field-specific entity records; determine a weightage score of each of the relations between the at least one pair of field-specific entity records; determine a change in the importance score of each of the field-specific entity records over a predefined duration of time, in the specific field segment; determine a change in the weightage scores of each of the relations associated with each field-specific entity record of the at least one pair of field-specific entity records over the predefined duration of time, in the specific field segment; and determine a net score of each of the field-specific entity records based on the change in the importance score and the weightage scores; and identify the incipient field-specific entity records based on the net score of each of the field-specific entity records in the specific field segment.

In an embodiment, the processing module is further operable to develop a structured database by extracting entity records from existing data sources, wherein each of the entity records comprises an entity name and a plurality of entity attributes; by identifying at least one field of each of the entity records based on at least one of the plurality of entity attributes and by segmenting the entity records into at least one field segment, based on the identified at least one field of each of the entity records, to obtain field-specific entity records. Optionally, the database arrangement is further operable to store the structured database.

In an embodiment, the processing module is further operable to develop an ontology for each of the at least one field; determine at least one similar field to the specific field based on the ontology of the specific field; and identify at least one incipient field-specific entity record from the at least one similar field. In another embodiment, the processing module comprises at least one crawler that is operable to extract entity records by crawling the existing data sources. In yet another embodiment, the at least one crawler is implemented using a distributed architecture.

In an embodiment, the processing module is further operable to develop the structured database by classifying each of the plurality of entity attributes into at least one class. In another embodiment, the processing module is operable to analyze the field-specific entity records in the specific field segment to determine the importance score of each of the field-specific entity records by determining an attribute-specific importance score for each of the plurality of entity attributes associated with each of the field-specific entity records; by determining a number of relations designated between the field-specific entity records between each of the field-specific entity records and at least one of the other field-specific entity records; and by aggregating the determined attribute-specific importance scores, number of designated relations, and the weightage scores of the designated relations to determine the importance score of each of the field-specific entity records.

In one embodiment, the processing module is operable to use the determined net score to identify at least one of a positive growth and/or a negative growth of each of the field-specific entity records. In another embodiment, the processing module is further operable to receive a user-input of a time period from the user; and use the time period as the predefined duration of time.

Furthermore, there is disclosed a computer readable medium containing program instructions for execution on a computer system, which when executed by a computer, cause the computer to perform method steps for identifying incipient field-specific entity records required by a user, the method comprising the steps of receiving a user-input of a specific field from the user, wherein the specific field corresponds to a specific field segment of at least one field segment; obtaining field-specific entity records comprising an entity name and a plurality of entity attributes, wherein each of the field-specific entity records is associated with the specific field segment; analyzing the field-specific entity records in the specific field segment, to determine an importance score of each of the field-specific entity records; identifying at least one pair of field-specific entity records having at least one similar entity attribute in the specific field segment; designating relations between each field-specific entity record of the identified at least one pair of field-specific entity records; determining a weightage score of each of the relations between the at least one pair of field-specific entity records; determining a change in the importance score of each of the field-specific entity records over a predefined duration of time, in the specific field segment; determining a change in weightage scores of each of the relations associated with each field-specific entity record of the at least one pair of field-specific entity records over the predefined duration of time, in the specific field segment; and determining a net score of each of the field-specific entity records based on the change in the importance score and the weightage scores; and identifying the incipient field-specific entity records based on the net score of each of the field-specific entity records in the specific field segment.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1B:
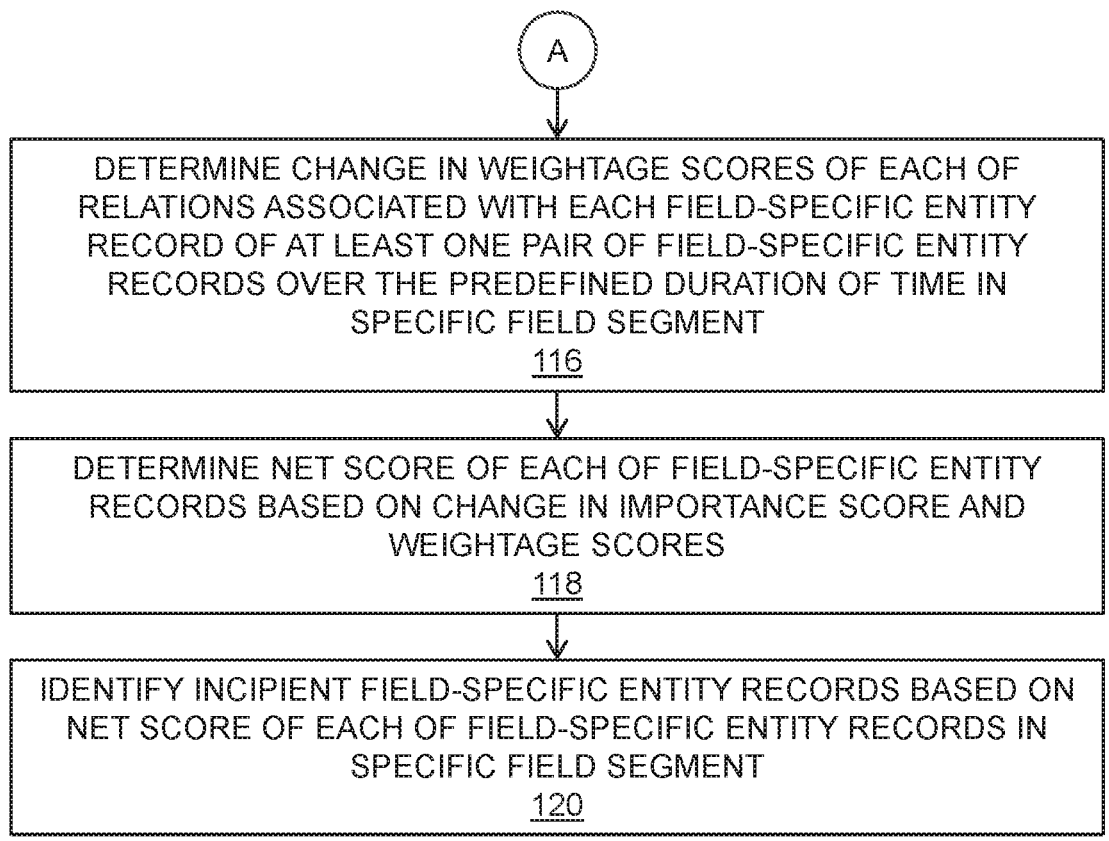

Referring to FIGS. 1A-B, illustrated are steps of a method 100 of identifying incipient field-specific entity records required by a user, in accordance with an embodiment of the present disclosure. At a step 102, a user-input of a specific field from the user is received, wherein the specific field corresponds to a specific field segment of at least one field segment. At a step 104, field-specific entity records comprising an entity name and a plurality of entity attributes are obtained, wherein each of the field-specific entity records is associated with the specific field segment. At a step 106, the field-specific entity records in the specific field segment are analyzed to determine an importance score of each of the field-specific entity records. At a step 108, at least one pair of field-specific entity records having at least one similar entity attribute in the specific field segment is identified. At a step 110, relations between each field-specific entity record of the identified at least one pair of field-specific entity records is designated. At a step 112, a weightage score of each of the relations is determined between the at least one pair of field-specific entity records. At a step 114, a change in the importance score of each of the field-specific entity records is determined over a predefined duration of time, in the specific field segment. At a step 116, a change in weightage scores of each of the relations associated with each field-specific entity record of the at least one pair of field-specific entity records over the predefined duration of time, in the specific field segment is determined. At a step 118, a net score of each of the field-specific entity records is determined based on the change in the importance score and the weightage scores. At a step 120, the incipient field-specific entity records are identified based on the net score of each of the field-specific entity records in the specific field segment.

The steps 102 to 120 are only illustrative and other alternatives can also be provided where one or more steps are added, one or more steps are removed, or one or more steps are provided in a different sequence without departing from the scope of the claims herein. In one example, the method 100 further comprises developing a structured database by extracting entity records from existing data sources, wherein each of the entity records comprises an entity name and a plurality of entity attributes; identifying at least one field of each of the entity records based on at least one of the plurality of entity attributes; and segmenting the entity records into at least one field segment based on the identified at least one field of each of the entity records, to obtain field-specific entity records. In another example, the method 100 further comprises developing an ontology for each of the at least one field; determining at least one similar field to the specific field based on the ontology of the specific field; and identifying at least one incipient field-specific entity record from the at least one similar field. In another example, the entity records are extracted by crawling the existing data sources. In yet another example, developing the structured database further comprises classifying each of the plurality of entity attributes into at least one class.

In an example, analyzing the field-specific entity records in the specific field segment to determine the importance score of each of the field-specific entity records comprises determining an attribute-specific importance score for each of the plurality of entity attributes associated with each of the field-specific entity records, determining a number of relations designated between the field-specific entity records between each of the field-specific entity records and at least one of the other field-specific entity records; and aggregating the determined attribute-specific importance scores, the number of designated relations and the weightage scores of the designated relations to determine the importance score of each of the field-specific entity records. In another example, the determined net score is used to identify at least one of a positive growth and/or a negative growth of each of the field-specific entity records. In yet another example, the method 100 further comprises receiving a user-input of a time period from the user, wherein the time period is associated with the predefined duration of time.

Figure 2:
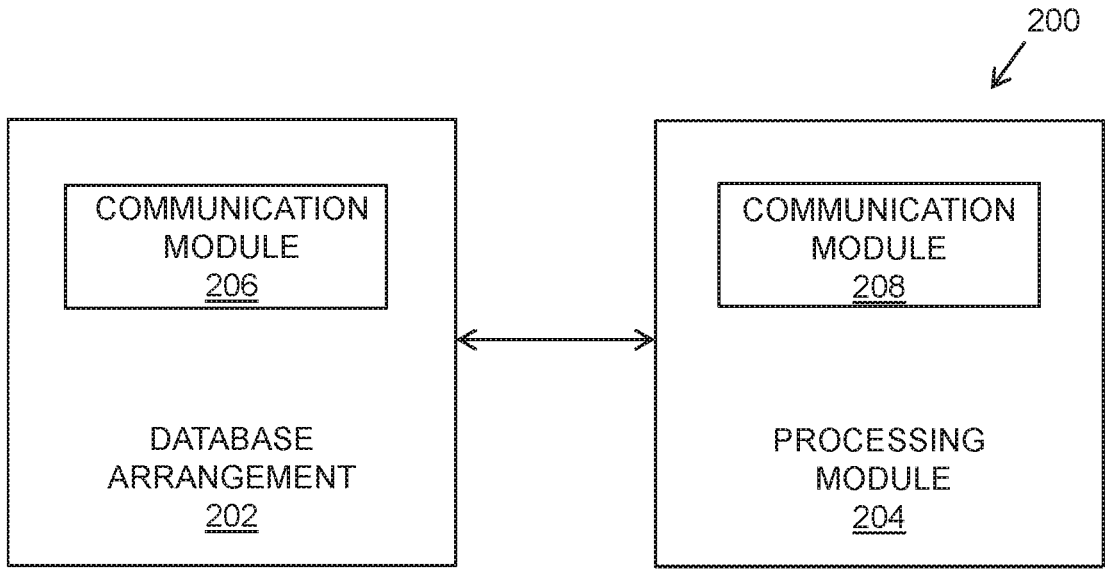
FIG. 2 is a block diagram of a system for identifying incipient field-specific entity records required by a user, in accordance with an embodiment of the present disclosure.

Referring to FIG. 2, there is shown a block diagram of a system 200 for identifying incipient field-specific entity records required by a user, in accordance with an embodiment of the present disclosure. The system 200 comprises a database arrangement 202 operable to store field-specific entity records. Furthermore, the system 200 comprises a processing module 204 communicably coupled to the database arrangement 202. As shown, the database arrangement 202 is communicably coupled to the processing module 204 via the communication modules 206 and 208.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of identifying incipient field-specific entity records required by a user, wherein the method comprises:
   receiving a user-input of a specific field from the user, wherein the specific field corresponds to a specific field segment of at least one field segment;
   obtaining field-specific entity records comprising an entity name and a plurality of entity attributes, wherein each of the field-specific entity records is associated with the specific field segment;
   analyzing the field-specific entity records in the specific field segment, to determine an importance score of each of the field-specific entity records;
   identifying at least one pair of field-specific entity records having at least one similar entity attribute in the specific field segment;
   designating relations between each field-specific entity record of the identified at least one pair of field-specific entity records;
   determining a weightage score of each of the relations between the at least one pair of field-specific entity records;
   determining:
      a change in the importance score of each of the field-specific entity records over a predefined duration of time, in the specific field segment;
      a change in weightage scores of each of the relations associated with each field-specific entity record of the at least one pair of field-specific entity records over the predefined duration of time, in the specific field segment; and
      a net score of each of the field-specific entity records based on the change in the importance score and the weightage scores;
   and
   identifying the incipient field-specific entity records based on the net score of each of the field-specific entity records in the specific field segment.

2. The method of claim 1, wherein the method further comprises:
   developing a structured database by:
      extracting entity records from existing data sources, wherein each of the entity records comprises an entity name and a plurality of entity attributes;
      identifying at least one field of each of the entity records based on at least one of the plurality of entity attributes; and
      segmenting the entity records into at least one field segment based on the identified at least one field of each of the entity records, to obtain field-specific entity records.

3. The method of claim 2, wherein the entity records are extracted by crawling the existing data sources.

4. The method of claim 2, wherein developing the structured database further comprises classifying each of the plurality of entity attributes into at least one class.

5. The method of claim 1, wherein the method further comprises:
developing an ontology for each of the at least one field;
determining at least one similar field to the specific field based on the ontology of the specific field; and
identifying at least one incipient field-specific entity record from the at least one similar field.

6. The method of claim 1, wherein analyzing the field-specific entity records in the specific field segment to determine the importance score of each of the field-specific entity records comprises:
determining an attribute-specific importance score for each of the plurality of entity attributes associated with each of the field-specific entity records;
determining a number of relations designated between the field-specific entity records between each of the field-specific entity records and at least one of the other field-specific entity records; and
aggregating the determined attribute-specific importance scores, the number of designated relations and the weightage scores of the designated relations to determine the importance score of each of the field-specific entity records.

7. The method of claim 1, wherein the determined net score is used to identify at least one of: a positive growth and/or a negative growth of each of the field-specific entity records.

8. The method of claim 1, wherein the method further comprises receiving a user-input of a time period from the user, wherein the time period is associated with the predefined duration of time.

9. A system for identifying incipient field-specific entity records required by a user, wherein the system comprises:
a database arrangement operable to store the field-specific entity records; and
a processing module communicably coupled to the database arrangement, wherein the processing module is operable to:
receive a user-input of a specific field from the user, wherein the specific field corresponds to a specific field segment of at least one field segment;
obtain field-specific entity records comprising an entity name and a plurality of entity attributes, wherein each of the field-specific entity records is associated with the specific field segment;
analyze the field-specific entity records in the specific field segment, to determine an importance score of each of the field-specific entity records;
identify at least one pair of field-specific entity records having at least one similar entity attribute in the specific field segment;
designate relations between each field-specific entity record of the identified at least one pair of field-specific entity records;
determine a weightage score of each of the relations between the at least one pair of field-specific entity records;
determine:
a change in the importance score of each of the field-specific entity records over a predefined duration of time, in the specific field segment;
a change in the weightage scores of each of the relations associated with each field-specific entity record of the at least one pair of field-specific entity records over the predefined duration of time, in the specific field segment; and
a net score of each of the field-specific entity records based on the change in the importance score and the weightage scores;
and
identify the incipient field-specific entity records based on the net score of each of the field-specific entity records in the specific field segment.

10. The system of claim 9, wherein the processing module is further operable to develop a structured database by:
extracting entity records from existing data sources, wherein each of the entity records comprises an entity name and a plurality of entity attributes;
identifying at least one field of each of the entity records based on at least one of the plurality of entity attributes; and
segmenting the entity records into at least one field segment, based on the identified at least one field of each of the entity records, to obtain field-specific entity records.

11. The system of claim 10, wherein the database arrangement is further operable to store the developed structured database.

12. The system of claim 10, wherein the processing module comprises at least one crawler that is operable to extract entity records by crawling the existing data sources.

13. The system of claim 12, wherein the at least one crawler is implemented using a distributed architecture.

14. The system of claim 10, wherein the processing module is further operable to develop the structured database by classifying each of the plurality of entity attributes into at least one class.

15. The system of claim 9, wherein the processing module is further operable to:
develop an ontology for each of the at least one field;
determine at least one similar field to the specific field based on the ontology of the specific field; and
identify at least one incipient field-specific entity record from the at least one similar field.

16. The system of claim 9, wherein the processing module is operable to analyze the field-specific entity records in the specific field segment to determine the importance score of each of the field-specific entity records by:
determining an attribute-specific importance score for each of the plurality of entity attributes associated with each of the field-specific entity records;
determining a number of relations designated between the field-specific entity records between each of the field-specific entity records and at least one of the other field-specific entity records; and
aggregating the determined attribute-specific importance scores, number of designated relations, and the weightage scores of the designated relations to determine the importance score of each of the field-specific entity records.

17. The system of claim 9, wherein the processing module is operable to use the determined net score to identify at least one of: a positive growth and/or a negative growth of each of the field-specific entity records.

18. The system of claim 9, wherein the processing module is further operable to:
receive a user-input of a time period from the user; and
use the time period as the predefined duration of time.

19. A computer readable medium containing program instructions for execution on a computer system, which when executed by a computer, cause the computer to perform method steps for identifying incipient field-specific entity records required by a user, the method comprising the steps of:

receiving a user-input of a specific field from the user, wherein the specific field corresponds to a specific field segment of at least one field segment;

obtaining field-specific entity records comprising an entity name and a plurality of entity attributes, wherein each of the field-specific entity records is associated with the specific field segment;

analyzing the field-specific entity records in the specific field segment, to determine an importance score of each of the field-specific entity records;

identifying at least one pair of field-specific entity records having at least one similar entity attribute in the specific field segment;

designating relations between each field-specific entity record of the identified at least one pair of field-specific entity records;

determining a weightage score of each of the relations between the at least one pair of field-specific entity records;

determining:
  a change in the importance score of each of the field-specific entity records over a predefined duration of time, in the specific field segment;
  a change in weightage scores of each of the relations associated with each field-specific entity record of the at least one pair of field-specific entity records over the predefined duration of time, in the specific field segment; and
  a net score of each of the field-specific entity records based on the change in the importance score and the weightage scores;
and
identifying the incipient field-specific entity records based on the net score of each of the field-specific entity records in the specific field segment.

* * * * *